Sept. 20, 1971      R. S. CARTWRIGHT      3,605,177
PULL
Filed May 20, 1970      2 Sheets-Sheet 1
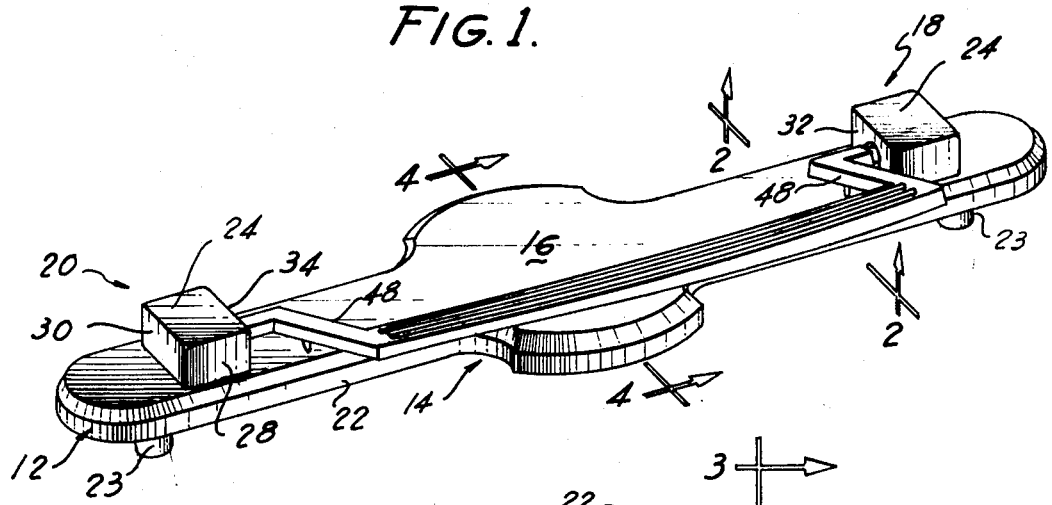
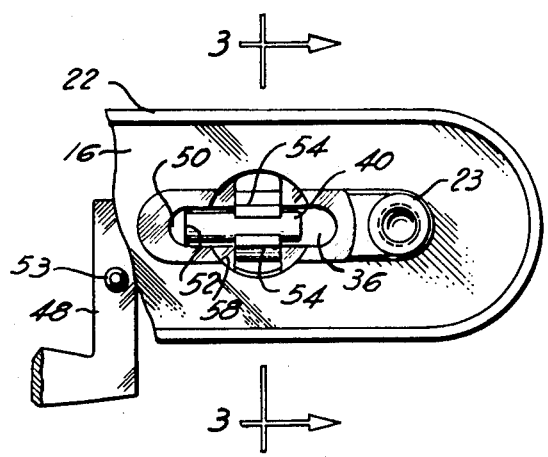
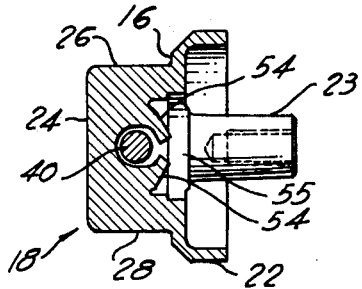
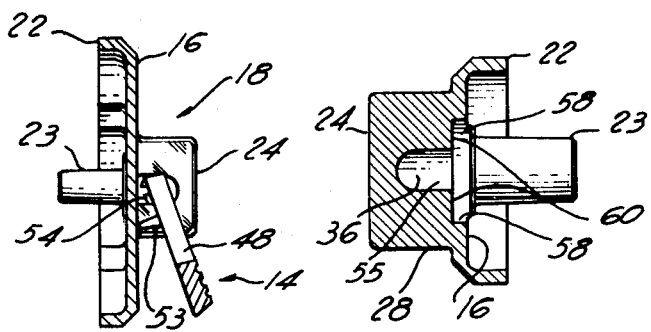
INVENTOR
Robert S. Cartright.
By Morton Lesser.
Attorney.

Sept. 20, 1971  R. S. CARTWRIGHT  3,605,177

PULL

Filed May 20, 1970  2 Sheets-Sheet 2

INVENTOR
Robert S. Cartright.

By Norton Lesser
Attorney.

United States Patent Office 3,605,177
Patented Sept. 20, 1971

3,605,177
PULL
Robert S. Cartwright, Booneville, N.C., assignor to
Stewart-Warner Corporation, Chicago, Ill.
Filed May 20, 1970, Ser. No. 39,113
Int. Cl. A07b 95/02
U.S. Cl. 16—125                             11 Claims

ABSTRACT OF THE DISCLOSURE

The following specification describes a pull in which a bail is pivotally supported by two spaced posts integrally formed on a common backplate with each post having concealed tangs formed therein to prevent disassembly of the bail.

BACKGROUND OF THE INVENTION

Field of the invention

The present invention relates in general to pulls and more particularly to a pull of the type having a backplate to which a bail is economically assembled with concealed ends.

Description of the prior art

Door or drawer pulls spanning a large area often comprise either several independent backplates with separate posts attached thereto having a bail pivotably suspended therebetween or a single large backplate with posts for pivotally supporting the bail. The use of integrally formed spaced posts on a single backplate for pivotally supporting the assembled bail, although desirable from the standpoint of appearance and shipment, presents problems since the bail spindles or ends must either be deformed to secure the bail to the backplate, which impairs the appearance, or uneconomic fabrication techniques must be employed.

SUMMARY OF THE INVENTION

The present invention proposes to solve the above problems through the use of concealed elongate recesses in the spaced integrally formed posts of a single backplate with the bail spindles assembled in the recesses by moving one bail end into one recess a sufficient distance to permit alignment of the other bail end with the opposite recess and then moving that bail end into the opposite recess so that both ends or spindles are located in respective recesses intermediate the recess ends. The walls of the recesses which are accessible through the rear of the backplate are then staked about the bail ends to limit axial movement of the bail ends for preventing disassembly while the staked walls are hidden from view.

It is therefore an object of the present invention to provide an economical backplate and bail assembly of pleasing appearance.

Other objects and features of the present invention will become apparent on examination of the following specification, claims and drawings.

BRIEF DESCRIPTION OF THE DRAWINGS

FIG. 1 is an isometric view of a pull embodying the principles of the present invention;

FIG. 2 is a sectional view taken along the line 2—2 in FIG. 1 and viewed in the direction of the arrows;

FIG. 3 is a sectional view taken along the line 3—3 in FIG. 2 and viewed in the direction of the arrows;

FIG. 4 is a sectional view taken along the line 4—4 in FIG. 1 and viewed in the direction of the arrows;

FIG. 5 is a view of the backplate along a line similar to FIG. 4, but before the bail is assembled and staked;

DESCRIPTION OF THE PREFERRED EMBODIMENTS

Figure 6:
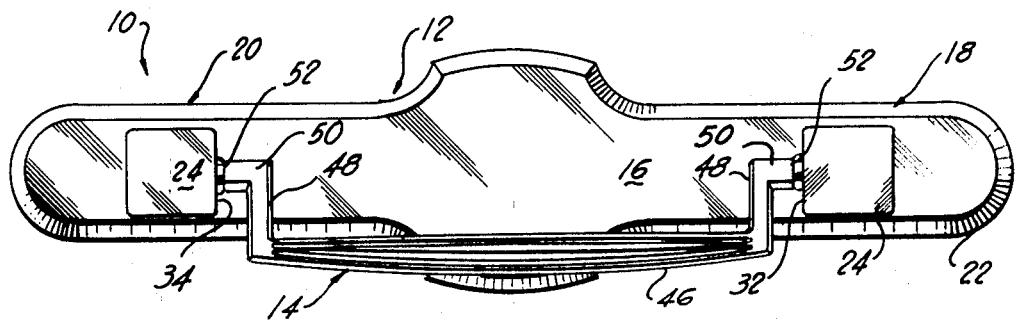
FIG. 6 is a front elevational view of the pull.

Referring now to the drawings, a pull is indicated therein by the reference character 10. The pull comprises a backplate 12 approximately 8 inches long and 1 inch wide with a widened decorative portion intermediate the plate ends and having a pivotally mounted U-shaped bail 14 thereon.

The plate 12 is formed of a die cast generally planar wall 16 having a pair of integrally formed spaced front posts 18 and 20 formed thereon, together with a peripheral flange 22 and transverse rear walls, where necessary, for rigidifying the backplate. In addition a pair of spaced rear posts 23 are formed on the rear surface of the backplate. The rear posts 23 have threaded openings which permit the backplate to be fastened to a drawer or door through spaced holes in the drawer so that only the front posts and bail are visible from the front of the pull, when mounted.

The posts 18 and 20 are each defined by a respective front wall 24; by a respective top wall 26, a bottom wall 28, a respective outer side wall 30 and an inner side wall 32 and 34, respectively, with inner side walls 32 and 34 spaced from each other approximately 4¾ inches. The walls 24, 26, 28, 30 and 32 of post 18 define a respective passageway 36 and the walls 24, 26, 28, 30 and 34 of post 20 define a respective passageway 38 as probably best seen in FIG. 7. Passageway 36 is substantially ⅝" long, ⁹⁄₁₆" wide and ⅜" deep, while passageway 38 is substantially ½" long, ⅜" deep and slightly larger than ⅛" wide. Each passageway receives a ⅛" diameter spindle 40 of the bail 14 through an opening 42 in the wall 32 and an opening 44 in wall 34 of the same width as the respective passageway and extending to the same depth.

The U-shaped bail 14 includes a back leg 46 and spaced side legs 48, which have arms 50 of generally rectangular or square cross section slightly less than ³⁄₁₆" on a side so as to enable the arms 50 to pass the opening 42, but not pass the opening 44. The arms 50 extend in opposite directions along a common axis perpendicular to the legs 48 and terminate in the spindles 40 approximately ⅜" long extending along the axis of arms 50 with the juncture of the arms and spindles defining shoulders 52, spaced apart slightly less than 4¾" as seen in FIG. 6. A stop 53 is provided on the rear side of each arm 58 for engagement with plate 12 to limit the rotation of bail 14 in a downward direction when the bail is manually released.

Figure 7:
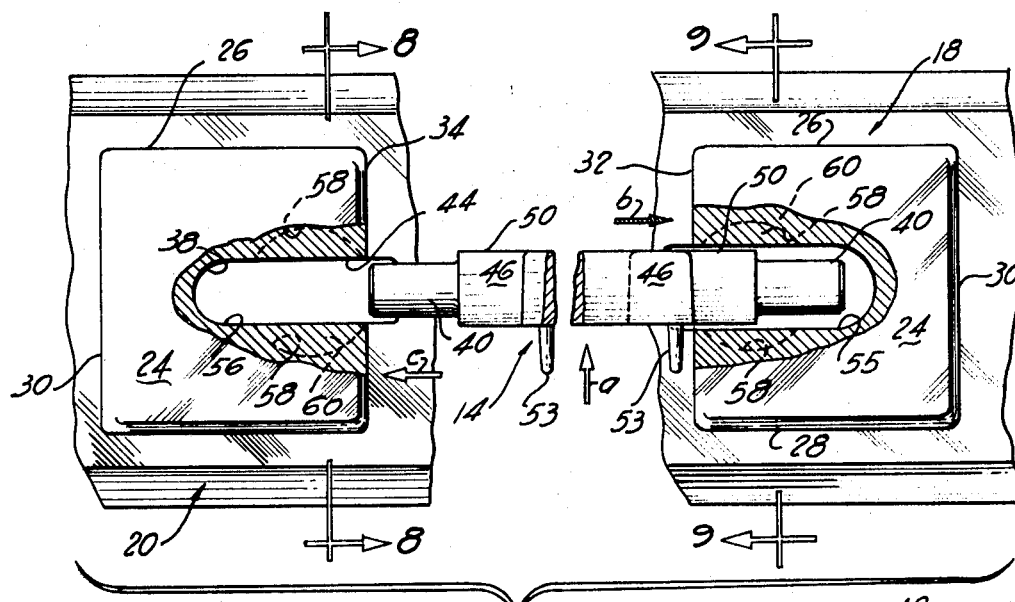
FIG. 7 is a fregmentary elevational view of the pull illustrating the manner in which the bail is assembled to the backplate.
Figure 9:
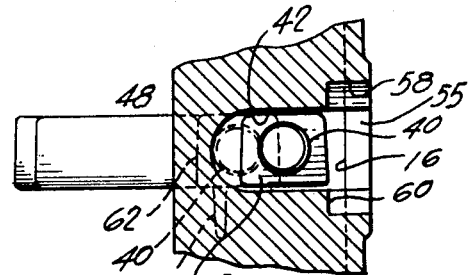
FIG. 9 is a sectional view taken along the line 9—9 in FIG. 7 and viewed in the direction of the arrows.

The shoulders 52 and respective arm 50 can pass through the opening 42 when the plane of the bail is aligned perpendicular to the plane of backplate wall 14, and the arms 50 are adjacent the wall 14 as seen in FIGS. 7 and 9, or when the bail is positioned backwards with the stops 53 projecting forwardly of the bail; however, the shoulder 52 and arm 50 cannot pass through the opening when one of the shoulder sides overlaps one of the edges of opening 42 as occurs when the stops 53 are engaged with plate wall 14 or when tangs 54, to be described, are formed.

As best seen in FIGS. 2 and 7, communication with the passageways 36 and 38 is also provided by aligned openings 55 and 56 of corresponding width in wall 14 behind the posts 18 and 20, respectively, and extending approximately ⅛" inwardly of walls 32 and 34, respectively. An arcuate or semicircular recess 58 is formed intermediate the ends of each elongate edge of each opening 54 and 56 to expose a pair of recessed portion 60 on the rear of each post. A tang or upset portion 54 is formed on each recessed portion with each tank 54 extending in a direction radially inwardly and to the rear of the spindles 40. The tanks 54 thereby hold the bail 14 spaced from wall 14 with the shoulders 52 overlapping the edges of openings 42 and 44 as indicated by dotted line 60 in FIG. 9 to prevent movement of arm 52 into opening 42 and possible disassembly of the bail 14 from the backplate 12. The tank 54 also assist in properly journaling the bail spindles 40.

Figure 8:
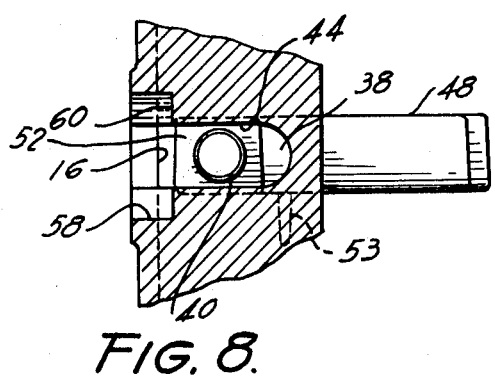
FIG. 8 is a sectional view taken along the line 8—8 in FIG. 7 and viewed in the direction of the arrows.

The bail 14 is assembled to the backplate 12 before the tanks 54 are fromed by inserting one spindle 40 through opening 42 and into passageway 36 with the bail 14 lying in a plane approximately perpendicular to the wall 16, as shown by arrow a in FIG. 7, or with the bail in reverse position to that shown in FIGS. 1 and 6 to permit the shoulder 52 adjacent opening 42 to pass opening 42 and enter passageway 36 as seen from FIGS. 7 and 9 and indicated by arrow b in FIG. 7. This allows the opposite bail spindle 40 to be aligned with opening 44 and passageway 38 as seen from FIGS. 7 and 8 and indicated by arrow c in FIG. 7. The bail 14 is then moved in the opposite direction toward passageway 38 to move the adjacent spindle 40 through opening 44 and into passageway 38 until the shoulder 52 adjacent opening 44 engages the opening edges, which serve as a stop. Both spindles 40 then lie in the respective passageways 36 and 38 with shoulders 52 adjacent the openings 42 and 44, respectively, and the bail is centered.

A staking tool is then engaged in recesses 58 and against the portions 60 or the back side of the post walls to deform the walls and form tangs 54 partially encircling the spindles 40 on the side adjacent plate 14. This forces the spindles slightly forwardly to position the shoulder 52 adjacent opening 42 in overlapping position relative the opening edges as indicated by dashed line 62 and thereafter prevent axial movement of shoulder 52 through opening 42 in all of the bail positions. The bail 14 cannot therefore be disassembled from the plate 12 while the spindles, passageways and tangs are concealed.

If desired, the spindles 40 may be tapered radially inwardly in a direction from the shoulders 52 to further assist in preventing axial movement of the bail 14 after the tangs 54 are formed and/or the tangs 54 may likewise be formed at an angle which tapers radially inwardly towards the spindle ends to prevent axial bail movement after assembly of the bail.

The foregoing is a description of an improved pull whose inventive concepts are believed set forth in the foregoing description and accompanying claims.

What is claimed is:

1. A pull of the type having a backplate adapted to be mounted on a drawer and a bail with a pair of spaced axially aligned spindles extending in opposite directions adjacent the ends of said bail, the improvement comprising a pair of spaced front posts extending forwardly of said backplate with each post having only one opening forwardly of said plate and the space between said openings being less than the distance between the ends of said spindles, a passageway in each of said posts communicating with a respective opening for receiving a respective spindle through the respective opening, and means integrally formed on said backplate for limiting axial movement of said spindles to prevent movement of said spindles from said passageways through said post openings to prevent disassembly of said bail from said backplate.

2. The pull claimed in claim 1 in which said posts are integrally formed on said backplate and said spindles each have a shoulder formed thereon.

3. The pull claimed in claim 2 in which one of said openings and one of said passageway is larger than one of said shoulders to facilitate axial movement of said one shoulder and respective spindle into said one passageway for thereafter enabling alignment of the other spindle with said other passageway and movement of said other spindle into said other passageway.

4. The pull claimed in claim 3 in which said axial limiting means comprises a tank formed rearwardly of each post for controlling the position of each spindle in the respective passageway to hold the respective shoulder in alignment with an edge of the respective opening to prevent movement of the spindle through the respective opening.

5. The pull claimed in claim 4 in which the other opening is smaller than the other shoulder to prevent movement of said other shoulder into said other passageway and thereby control the position of said shoulders relative said posts.

6. A pull of the type having a generally planar backplate adapted to be mounted on a drawer and a generally U-shaped bail with a pair of spaced axially aligned spindles extending in opposite directions adjacent the ends of the legs of said U-shaped bail, the improvement comprising a pair of spaced front posts extending forwardly of the front surface of said backplate and integrally formed on said backplate with each post having an opening spaced apart less than the distance between the ends of said spindles, a passageway on each of said posts communicating with a respective opening for receiving a respective spindle in a position concealed from view, an arm between each spindle and the adjacent bail leg whereby movement of one of said spindles and respective arm into a respective passageway to a predetermined position enables the end of the other spindle to be aligned with the other opening and passageway and moved axially into said other passageway until each arm is spaced adjacent a respective opening, and means integrally formed on said backplate in a position concealed by said posts for thereafter limiting axial movement of said spindles to prevent disassembly of said bail from said backplate.

7. The pull claimed in claim 6 in which said one arm defines a shoulder having a cross sectional dimension smaller than said respective passageway, and said means for limiting axial movement places said shoulder in a position overlapping the edges of the adjacent opening.

8. The pull claimed in claim 7 in which said backplate has an opening behind each post communicating with a respective passageway, and said means for limiting axial movement comprises a tang formed on a wall of each passageway through the repective backplate opening.

9. In the pull claimed in claim 8 another pair of spaced posts integrally formed on said backplate and projecting rearwardly of said backplate with each other post having a threaded opening therein to facilitate mounting of said backplate on a drawer.

10. A pull of the type having a generally planar backplate adapted to be mounted on a drawer and a generally U-shaped bail with spaced axially aligned spindles extending in opposite directions adjacent the ends of the legs of said U-shaped bail, the improvement comprising a pair of spaced front posts extending outwardly of said backplate with each of said posts defining a respective internal passageway concealed from normal view for receiving a respective spindle substantially concealed from view in said passageway, each post having an opening in facing relationship communicating with a respective passageway for passing a respective spindle with one of said openings being larger than the other opening and spaced by a distance less than the distance between the ends of said spindles, said backplate having spaced elongate openings each aligned with a respective one of said passageways with the elongate edges of each elongate opening having an arcuate recess therein for communication with a respective portion of the rear side of each post, an arm on the end of each bail side leg between each leg and the respective spindle and defining a shoulder formed at the juncture of each spindle with the respective arm with one of said shoulders adapted to pass through said larger opening and enter said passageway in response to said bail being positioned in a plane perpendicular to said backplate and being spaced adjacent said backplate to enable alignment of said other spindle with said other opening and movement of said other spindle into said other passageway until said shoulders are spaced adjacent the respective post opening, and tangs formed from said respective portion of the rear side of each post to move said one shoulder into overlapping position relative to edge of said larger opening and thereafter prevent movement of said shoulder through said larger opening and disassembly of said bail from said backplate.

11. The pull claimed in claim 10 in which each tang assists in journaling the adjacent spindle.

References Cited
UNITED STATES PATENTS

| | | | |
|---|---|---|---|
| 2,157,251 | 5/1939 | Timnerman | 16—125 |
| 2,652,909 | 9/1953 | Knell | 16—126 |

BOBBY R. GAY, Primary Examiner

D. L. TROUTMAN, Assistant Examiner